United States Patent
Lobenstein et al.

(10) Patent No.: US 12,119,744 B2
(45) Date of Patent: Oct. 15, 2024

(54) CIRCUIT ASSEMBLY FOR CONNECTING TO A CURRENT SOURCE

(71) Applicant: Endress+Hauser SE+Co. KG, Maulburg (DE)

(72) Inventors: Ralf Lobenstein, Schopfheim (DE); Harald Schäuble, Lörrach (DE); Julian Bockstaller, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 212 days.

(21) Appl. No.: 17/757,369

(22) PCT Filed: Nov. 20, 2020

(86) PCT No.: PCT/EP2020/082918
§ 371 (c)(1),
(2) Date: Jun. 15, 2022

(87) PCT Pub. No.: WO2021/121865
PCT Pub. Date: Jun. 24, 2021

(65) Prior Publication Data
US 2023/0023908 A1  Jan. 26, 2023

(30) Foreign Application Priority Data
Dec. 16, 2019 (DE) .................... 10 2019 134 598.7

(51) Int. Cl.
*H02M 3/158* (2006.01)
*H02M 1/00* (2006.01)
*H02M 1/36* (2007.01)

(52) U.S. Cl.
CPC ......... *H02M 3/158* (2013.01); *H02M 1/0006* (2021.05); *H02M 1/36* (2013.01)

(58) Field of Classification Search
CPC ....... H02M 3/158; H02M 1/0006; H02M 1/36
See application file for complete search history.

(56) References Cited

U.S. PATENT DOCUMENTS

| | | | |
|---|---|---|---|
| 10,855,170 B2* | 12/2020 | De Vos | H02J 7/0024 |
| 2021/0036548 A1* | 2/2021 | Shousha | H02M 3/07 |

FOREIGN PATENT DOCUMENTS

EP          3491726 A1    6/2019

* cited by examiner

*Primary Examiner* — Rafael O Leon De Domenech
(74) *Attorney, Agent, or Firm* — Mark A. Logan; Endress+Hauser (USA) Holding, Inc.

(57) ABSTRACT

A circuit assembly for connection to a current source, preferably a 4-20 mA current loop and/or a high-impedance voltage source, preferably a high-impedance voltage source comprising an internal resistance greater than or equal to 100 ohms, includes at least one boost converter with a coil, a diode, in particular a flyback diode, which is connected in series with the coil, an output-side storage capacitor for summing an output voltage, and a switching element for connecting the coil to ground; a circuit part for dynamically controlling the switching element of the boost converter, wherein the circuit part is at least designed to control the switching element of the boost converter in a start-up phase such that the current source directly charges the storage capacitor via the coil until a predefinable reference value is reached.

13 Claims, 1 Drawing Sheet

CIRCUIT ASSEMBLY FOR CONNECTING TO A CURRENT SOURCE

CROSS-REFERENCE TO RELATED APPLICATIONS

The present application is related to and claims the priority benefit of DPMA Patent Application No. 10 2019 134 598.7, filed on Dec. 16, 2019, and International Patent Application No. PCT/EP2020/082918, filed on Nov. 20, 2020, the entire contents of which are incorporated herein by reference.

TECHNICAL FIELD

The invention relates to a circuit assembly for connecting to a current source, and to a field device of automation technology.

BACKGROUND

Field devices serving to capture and/or modify process variables are frequently used in process automation technology. Sensors, such as fill level measuring devices, flow meters, pressure and temperature measuring devices, pH redox potential meters, conductivity meters etc., are used for recording the respective process variables, such as fill level, flow, pressure, temperature, pH level, and conductivity. Field devices, in principle, refer to all devices that are used in-process and that supply or process process-relevant information.

A variety of such field devices is manufactured and marketed by the Endress+Hauser company.

Two-wire field devices, which are connected via a two-wire line or two-wire loop to a higher-level unit, e.g., a control unit PLC, are still common at the present time in a multitude of existing automation systems. The two-wire field devices are designed in such a way that current is supplied via the two-wire line by a 4-20 mA signal. Due to the current supply by the 4-20 mA signal, only very limited current is available internally to the field device. This leads to the individual electrical components of the field device being matched to one another in such a way that the total current requirement of the field device just fails to exceed a current provided via the two-wire line. In order to nevertheless be able to operate electrical or electronic components which, at short notice, have a higher current requirement than is actually available, (storage) capacitors with corresponding capacitances are typically used. In order to provide sufficient current for charging such capacitors, the smallest possible voltage drop across the two-wire line is used as a current source and the voltage is boosted. Usually, what are known as boost converters (also called step-up converters) are hereby used. In operating such boost converters at a current source, for example as represented by a two-wire line, or a high-impedance voltage source, the start-up phase is problematic in particular. If an operating voltage reaches a switch-on threshold of the boost converter, an increased current flow is the result, which in turn allows the operating voltage to drop below the switch-on threshold and can lead to the boost converter switching off. Safely switching on or starting up the boost converter is thus compromised.

SUMMARY

It is thus an object of the invention to propose a circuit assembly that enables safe switching-on or starting-up of a boost converter.

The circuit assembly according to the invention for connection to a current source, preferably a 4-20 mA current loop, and/or a voltage source, preferably a voltage source comprising an internal resistance greater than or equal to 100 ohms (Ri≥100 ohms), comprises:
- at least one boost converter with a coil; a diode, in particular a flyback diode, which is connected in series with the coil; an output-side storage capacitor for summing an output voltage; and a switching element for connecting the coil to ground;
- a circuit part for dynamically controlling the switching element of the boost converter, wherein the circuit part is at least designed to control the switching element of the boost converter in a start-up phase such that the current source directly charges the storage capacitor via the coil until a predefinable or adjustable switching threshold is reached.

According to the invention, a circuit assembly is proposed which is designed for dynamic operation. This means that, even given a completely discharged capacitor, the circuit starts safely and can subsequently change without problems into the actual boost operation in an operating phase following a start-up phase. The storage capacity is hereby charged directly from the current source in the start-up phase.

According to an advantageous embodiment of the circuit assembly according to the invention, the circuit part is furthermore designed to control the switching element of the boost converter, after the switching threshold has been reached in an operating phase following the start-up phase, such that the coil is cyclically connected to ground. According to the embodiment, the boost converter is activated or active only upon reaching the reference voltage at TP1.

According to a further advantageous embodiment of the circuit assembly according to the invention, the circuit part comprises a comparator and a capacitor, wherein, for dynamic control, the comparator is connected with an output to the switching element and to which, at an inverting input, a reference voltage is applied for predefining or adjusting the switching threshold; and wherein, for voltage stabilization, the capacitor is connected in parallel with the current loop. In particular, the embodiment of the circuit assembly according to the invention can provide that the circuit part furthermore comprises a voltage divider which is connected with a resistor to the current source and with a further resistor to ground, wherein the comparator is connected with a non-inverting input to the voltage divider between the two resistors so that a substantially constant voltage drops across the current source in the operating phase. Via the voltage divider, the voltage drop across the current source or the 4-20 mA current loop can be defined or manipulated via an optional additional circuit. Additionally or alternatively, the embodiment can provide that the comparator has an internal reference module which provides the reference voltage. According to an alternative embodiment, the circuit assembly can have a microcontroller that provides the reference voltage.

According to a further advantageous embodiment of the circuit assembly according to the invention, the boost converter comprises a further capacitor which is connected in parallel with the storage capacitor. In particular, the embodiment can provide that the further capacitor has a capacitance value between 10 and 500 μF, preferably between 50 and 250 μF, particularly preferably between 80 and 150 μF, very particularly preferably 100 μF.

According to a further advantageous embodiment of the circuit assembly according to the invention, the circuit part furthermore comprises a Zener diode which is connected in parallel with the current source.

According to a further advantageous embodiment of the circuit assembly according to the invention, the circuit part furthermore comprises a capacitor and a further resistor, wherein the capacitor is connected in parallel with the circuit source, and the further resistor is connected in series with the coil and the diode.

According to a further advantageous embodiment of the circuit assembly according to the invention, a further Zener diode is provided which is connected in parallel with the storage capacitor.

According to a further advantageous embodiment of the circuit assembly according to the invention, the comparator according to FIG. 2 is connected with a positive supply voltage pin to the current source, and with a negative supply voltage pin to ground, wherein a low-pass filter is preferably connected to the positive supply voltage pin in order to stabilize the voltage supply of the comparator according to FIG. 2.

The invention furthermore relates to a field device of automation technology, comprising a terminal pair for connecting the field device to a 4-20 mA current loop, a radio module for wireless communication with the field device, and a circuit assembly according to at least one of the preceding embodiments, wherein the circuit assembly is connected on the input side to the terminal pair and on the output side to the radio module. The radio module preferably constitutes an NB-IoT (Narrowband Internet of Things) radio module. NB-IoT is a low-current wide-area network radio technology standard, developed by 3GPP, which enables a wide range of mobile radio devices and mobile radio services. The specification was frozen in 3GPP Release 13 in June 2016.

BRIEF DESCRIPTION OF THE DRAWINGS

The invention is explained in more detail on the basis of the following drawings. The following is shown.

DETAILED DESCRIPTION

Figure 1:
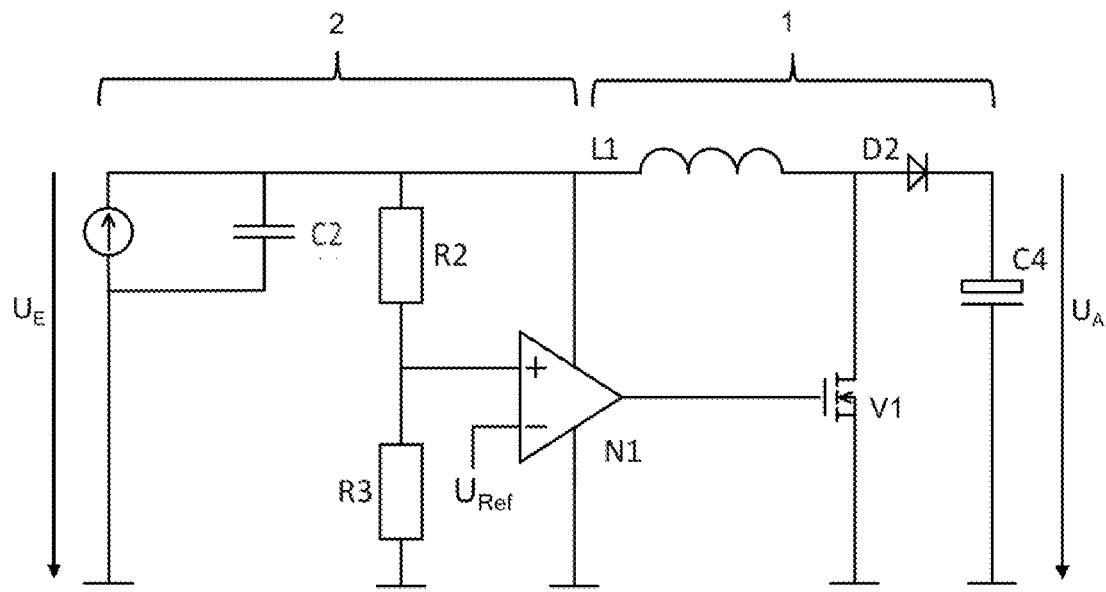
FIG. 1 shows a first embodiment of the circuit assembly according to the present disclosure.

FIG. 1 shows a first embodiment of a circuit assembly according to the invention. The circuit assembly is fed on the input side from a 4-20 mA current loop (symbolically represented by a switching symbol for a current source in FIG. 1). In particular, the circuit assembly can be used in a field device of automation technology. In particular, the circuit assembly in a field device can be used to supply a radio module, e.g., an NB-IoT module, with current from the current loop. Such an NB-IoT module has a very high short-term current requirement, which can be accommodated only via a large storage capacitor, e.g., a storage capacitor with a capacity of approximately 5 F. In order to provide sufficient current for charging the storage capacitor, the circuit assembly uses the smallest possible voltage drop from the 4-20 mA current loop as a current source, and the voltage is boosted by a boost converter.

Alternatively, the circuit assembly can also be connected to a current source or a (high-impedance) voltage source having an internal resistance greater than or equal to 100 ohms (Ri≥100 ohms). Another possibility is to connect the circuit assembly to a voltage source and a current source connected in series therewith.

FIG. 1 shows a basic variant of the circuit assembly according to the invention, which is required for operating the circuit. In addition, the circuit assembly as shown in FIG. 2 can have further electronic circuit elements/components which bring about advantageous effects.

The circuit assembly according to the invention shown in FIG. 1 comprises at least one boost converter 1 and a circuit part for dynamically controlling 2 the boost converter 1 in order to overcome the aforementioned problematic start-up phase.

The boost converter 1 consists of a coil L1, connected in series with a diode D2, with an inductance and a suitable switching element V1 connecting the coil to ground. The switching element V1 can, for example, be a MOSFET which is dynamically connected at its gate by the circuit part for controlling 2 the boost converter 1. The boost converter 1 furthermore comprises, on the output side, a storage capacitor C4 for summing the storage current at the output UA.

Figure 2:
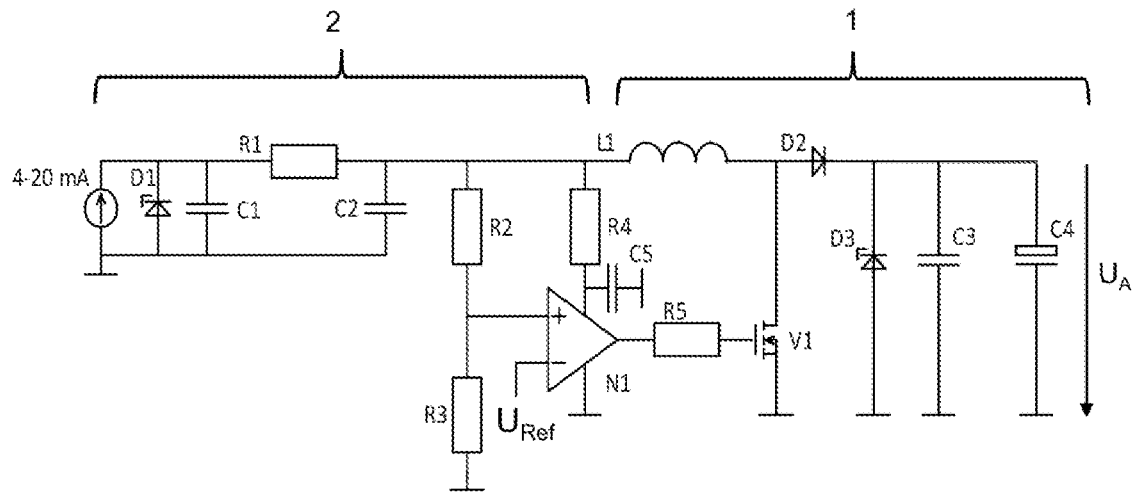
FIG. 2 shows a second embodiment of the circuit assembly according to the present disclosure.

In addition, as shown in FIG. 2, a third capacitor C3 can be provided which is connected in parallel with the storage capacitor C4. The third capacitor C3 can in particular have a capacitance of from a few 10 μF up to a few 100 μF, preferably approximately 100 μF (microfarads). Output voltage peaks at the storage capacitor C4 due to its low internal inductance, low equivalent series resistance, and short electrical connection can hereby be reduced. In addition or as an alternative to the third capacitor C3, as likewise shown in FIG. 2, a third Zener diode D3 can also be connected in parallel with the storage capacitor C4 in order to protect the latter against overvoltage.

According to the basic variant, the circuit part for dynamically controlling 2 the boost converter 1 comprises a comparator N1 which is connected with its output to the gate of the MOSFET; a voltage divider R2, R3 for switching the comparator N1; and, for voltage stabilization, a second capacitor C2 which is connected in parallel with the current loop. The MOSFET is connected with a drain to an anode of the second diode D2, and is connected with a source to ground. The voltage divider R2, R3 is connected with the second resistor R2 to the current loop, and with the third resistor R3 to ground. The voltage tap for a plus input (non-inverting input) of the comparator takes place between the second and third resistors. A voltage drop in the current loop is likewise defined by the voltage divider. For example, the voltage divider R2, R3 can be dimensioned in such a way that there is approximately an 1.8 V drop across it.

The actual switching threshold of the comparator is defined by applying a reference voltage to a minus input (inverting input) of the comparator. The reference voltage URef can, for example, be provided by an internal reference voltage module of the comparator N1. Alternatively, the reference voltage URef can also be provided externally, for example by a microcontroller integrated into a field device electronics system. The reference voltage can be 1.2 V, for example. The comparator N1 is furthermore connected with a positive supply voltage pin to the current loop, and with a negative supply voltage pin to ground. In order to stabilize the voltage supply for the comparator, a fourth resistor R4 and a fifth capacitor C5, interconnected as a low-pass filter, can furthermore be connected to the positive supply voltage pin.

By manipulating the voltage divider R2, R3 or the reference voltage at the comparator N1, a voltage drop across the current source can be adjusted. This is advantageous in particular in the event that the circuit assembly is connected to a 4-20 mA current loop, since the voltage drop can thus be kept small, preferably less than 2.5 V, particularly preferably less than 2 V, very particularly preferably approximately 1.8 V. This can take place, for example, via a microcontroller port, a pulse width modulation with a low-pass filter, or by a digital-to-analog converter. The charging time of the storage capacitor C4 can thus be influenced.

In addition, as shown in FIG. 2, a first Zener diode D1 can be connected in parallel with the second capacitor C2 in order to realize a protection of the circuit assembly. In addition or as an alternative to this, a further first capacitor C1 and a first resistor R1, which serve as a filter, can furthermore be provided on the input side. The first capacitor C1 can be connected in parallel with the first Zener diode D1, and the first resistor R1 can be connected in series with the coil L1 and the diode D2. Both circuit elements serve to reduce possible disturbances to the current loop. The first and second capacitors are preferably dimensioned such that the second capacitor C2 has a higher capacitance than the first capacitor C1. The second capacitor C2 is charged up to the switching threshold (switch-on threshold) of the comparator N1 and, after switching on the MOSFET, is discharged again up to the switching threshold (switch-off threshold) of the comparator N1.

After switching-on, a loop current flows through the circuit assembly in a start-up phase and slowly charges the capacitors C1 to C4. The voltage at the output capacitors C3, C4 is lower by a flux voltage of the second diode (Schottky diode) D2 and the voltage drops across the longitudinal impedances of the coil L1 and of the first resistor R1. At the switch-on moment, the supply voltage at the comparator N1 is initially still below the switching threshold (switch-on threshold), so that the MOSFET located at the output of the comparator is initially still switched to non-conductive. If the minimum operating voltage of the comparator N1 is reached, the latter becomes active, but the reference voltage is not yet reached at the non-inverting input, so that the output remains at "Low" and the MOSFET continues to be non-conductive. If the reference voltage at the non-inverting input is reached or exceeded, the MOSFET V1 is switched to conductive by the comparator, and the inductance L1 is charged against ground, but only until the voltage at the non-inverting input of the comparator N1 again falls below the reference voltage. This results in the MOSFET again switching to non-conductive.

In order to achieve the highest possible switching frequency, a hysteresis of the comparator should be as small as possible. For example, the comparator should be selected in such a way that the hysteresis is only a few millivolts (mV), for example approximately 40 mV. In this way, the storage capacitor C4 is charged slowly. The ripple after the resistor R1 corresponds to the switching hysteresis of the comparator N1. The influence on the current loop can optionally be reduced by the resistor R1 and the capacitor C1. The charging process of the capacitors C3/C4 can optionally be limited by the Zener diode D3 and thus be protected against overvoltage.

If a high load is connected in parallel with C4, the latter discharges slowly, because the current from the current loop is not sufficient to maintain the charge at C4. After the high load is switched off, C4 is charged again. The output voltage of the circuit is thus subject to fluctuations. A stabilization of the output voltage UA might be necessary. For this purpose, the circuit assembly can, for example, have a linear regulator or a DC/DC converter.

The invention claimed is:

1. A circuit assembly for connection to a current source and/or a voltage source, comprising:
    a boost converter including a coil, a flyback diode connected in series with the coil, an output-side storage capacitor for summing an output voltage, and a switching element for connecting the coil to ground; and
    a circuit part for dynamically controlling the switching element of the boost converter, wherein the circuit part is designed to control the switching element of the boost converter in a start-up phase such that the current source directly charges the storage capacitor via the coil until a predefinable or adjustable switching threshold is reached.

2. The circuit assembly according to claim 1, wherein the circuit part is further designed to control the switching element of the boost converter after the switching threshold has been reached in an operating phase following the start-up phase such that the coil is cyclically connected to ground.

3. The circuit assembly according to claim 2,
    wherein the circuit part includes a comparator and a capacitor,
    wherein, for dynamic control, the comparator is connected with an output to the switching element, and to which is applied, at an inverting input, a reference voltage for predefining or adjusting the switching threshold, and
    wherein, for voltage stabilization, the capacitor is connected in parallel with the current source.

4. The circuit assembly according to claim 3,
    wherein the circuit part further includes a voltage divider connected with a first resistor to the current source, and with a second resistor to ground, and
    wherein the comparator is connected with a non-inverting input to the voltage divider between the two resistors so that a substantially constant voltage drops across the current source during the operating phase.

5. The circuit assembly according to claim 4, further comprising:
    a microcontroller that provides the reference voltage.

6. The circuit assembly according to claim 4, wherein the circuit part further includes a Zener diode connected in parallel with the current source.

7. The circuit assembly according to claim 6, wherein the circuit part further includes a capacitor and a further resistor, wherein the capacitor is connected in parallel with the circuit source, and the further resistor is connected in series with the coil and the diode.

8. The circuit assembly according to claim 7, wherein the boost converter further includes a further Zener diode connected in parallel with the storage capacitor.

9. The circuit assembly according to claim 3, wherein the comparator has an internal reference module which provides the reference voltage.

10. The circuit assembly according to claim 3, wherein the comparator is connected with a positive supply voltage pin to the current source and with a negative supply voltage pin to ground, wherein a low-pass filter is connected to the positive supply voltage pin to stabilize the voltage supply of the comparator.

11. The circuit assembly according to claim 1, wherein the boost converter further includes a further capacitor connected in parallel with the storage capacitor.

12. The circuit assembly according to claim 11, wherein the further capacitor has a capacitance value between 10 and 500 μF.

13. A field device of automation technology, comprising:
a terminal pair for connecting the field device to a 4-20 mA current loop;
a radio module for wireless communication with the field device; and
a circuit assembly, including:
- a boost converter including a coil, a flyback diode connected in series with the coil, an output-side storage capacitor for summing an output voltage, and a switching element for connecting the coil to ground; and
- a circuit part for dynamically controlling the switching element of the boost converter, wherein the circuit part is designed to control the switching element of the boost converter in a start-up phase such that the current loop directly charges the storage capacitor via the coil until a predefinable or adjustable switching threshold is reached, wherein the circuit assembly is connected on the input side to the terminal pair and on the output side to the radio module.

\* \* \* \* \*